(No Model.) 2 Sheets—Sheet 1.
C. A. DAKE, F. P. SHEPARD & F. S. PECK.
PHOTOGRAPHIC CAMERA.
No. 597,268. Patented Jan. 11, 1898.
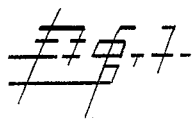
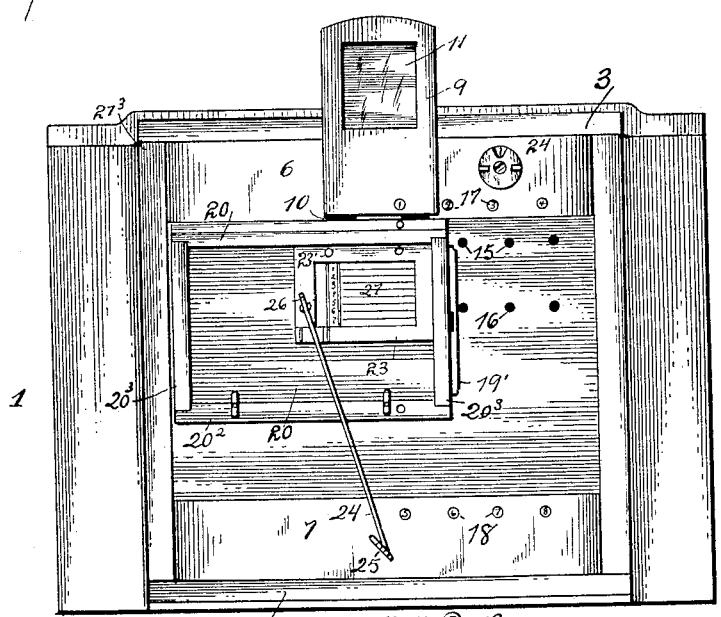
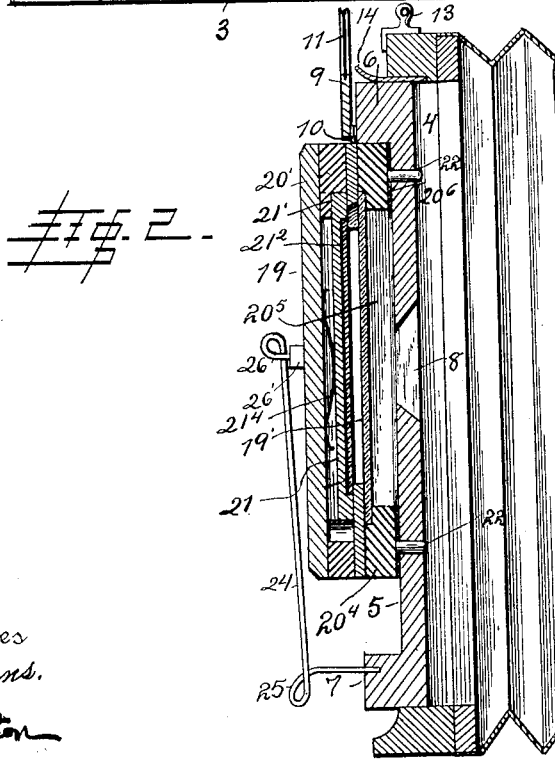
Witnesses
V. J. Evans.
[signature]
Inventors
Chas. A. Dake.
Frank S. Peck.
Frank P. Shepard.
By [signature] Attorney (No Model.) 2 Sheets—Sheet 2.
C. A. DAKE, F. P. SHEPARD & F. S. PECK.
PHOTOGRAPHIC CAMERA.
No. 597,268. Patented Jan. 11, 1898.
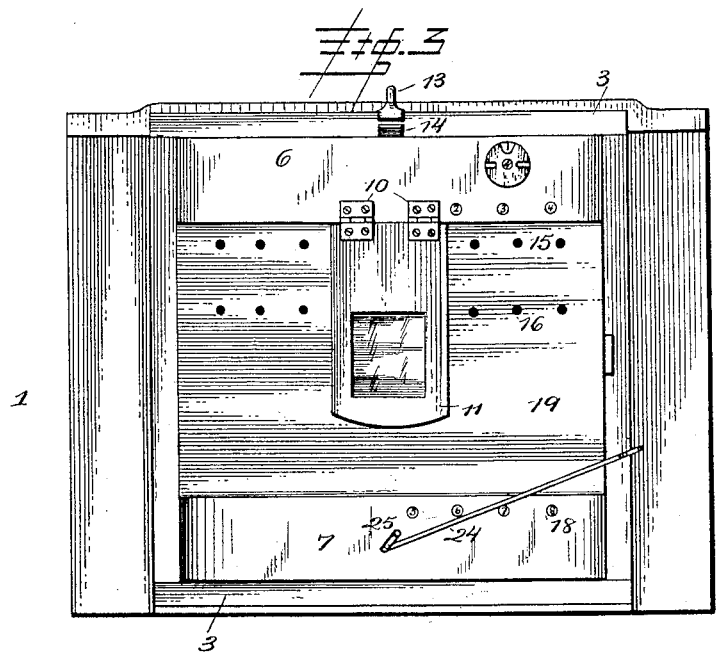
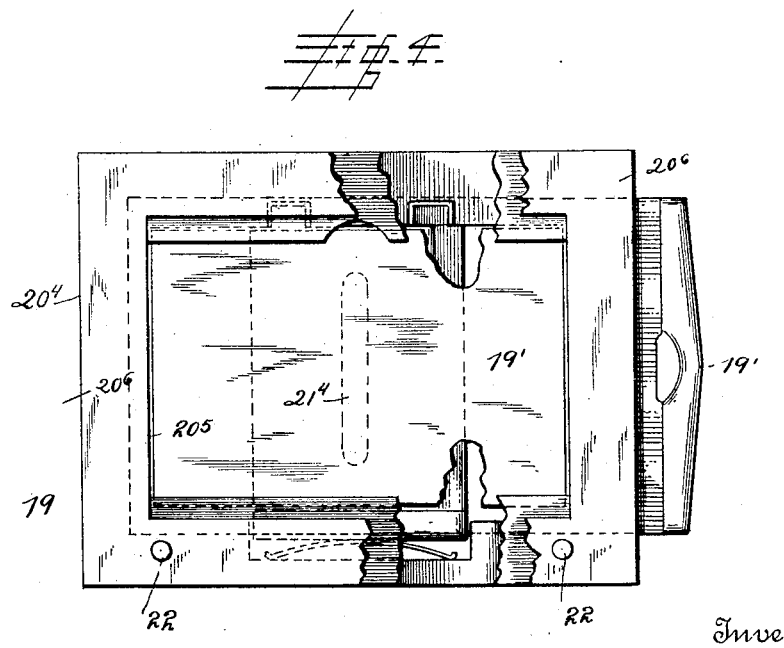
Witnesses
V. J. Evans.
Ann Poynton
Inventors
Chas. A. Dake.
Frank S. Peck.
Frank P. Shepard.
By John Hedderbrone
Attorney

UNITED STATES PATENT OFFICE.

CHARLES A. DAKE, FRANK P. SHEPARD, AND FRANK S. PECK, OF EDMOND, OKLAHOMA TERRITORY.

PHOTOGRAPHIC CAMERA.

SPECIFICATION forming part of Letters Patent No. 597,268, dated January 11, 1898.

Application filed April 3, 1897. Serial No. 630,569. (No model.)

*To all whom it may concern:*

Be it known that we, CHARLES A. DAKE, FRANK P. SHEPARD, and FRANK S. PECK, citizens of the United States, residing at Edmond, in the county of Oklahoma and Territory of Oklahoma, have invented certain new and useful Improvements in Photographic Cameras; and we do hereby declare the following to be a full, clear, and exact description of the invention, such as will enable others skilled in the art to which it appertains to make and use the same.

This invention relates to an attachment for photographic cameras, the object being to provide an improved device adapted to be attached to a camera whereby a number of exposures may be made upon a single photographic plate with a single lens, with which the camera is provided, and without employing additional lenses.

The invention consists in certain novel constructions, combinations, and arrangements of parts, as will be hereinafter more fully described, and specifically set forth in the appended claim.

In the accompanying drawings, Figure 1 is a rear elevation of our improved attachment with the plate-holder in place. Fig. 2 is a central vertical section. Fig. 3 is a rear elevation with the plate-holder removed and the focusing-screen in position for use; and Fig. 4 is a side elevation of a plate-holder, showing the dowel-pins.

Like numerals designate like parts throughout the several views.

Referring to the drawings, the numeral 1 designates a camera of ordinary construction provided with a lens at the front thereof and a guideway formed by strips 3 at the rear, in which the plate-holder normally fits and to which the ground-glass frame 4 is connected so as to fit in the said guideway when it is desired to focus the camera.

Our invention has for its object the provision of a device adapted to be positioned in the said guideway and so constructed that the plate-holder may be attached thereto and shifted to a variety of positions, in order that a series of exposures may be made upon one plate and the lines between the different exposures clearly and mathematically defined.

Our invention comprises a board or plate 5, provided at the top and bottom thereof with transverse cleats 6 and 7, secured thereto by screws or otherwise. This plate or board is provided with a central opening 8, widest on the inner side of the said board or plate 5, and thence converging to the outer side and contracted where it passes through said outer side. This opening, when the device is applied to the rear of a camera, is in line with the lens 2, so that the light-rays coming from the lens may pass through the said opening, the opening being widest at the inner side facing the lens, in order that the light-rays which diverge from the lens may be collected, in order that the photographic plate may receive full benefit of all the light-rays passing from the lens, and also to insure that the exposed surface may have sharply-divided lines. A focusing-frame 9 is secured to the upper cleat 6 by hinges 10 and is provided with an opening in which ground glass 11 is inserted. This focusing-frame is adapted to be tilted down, so as to bring its ground glass in position immediately in the rear of the opening 8, in order that the camera may be focused, and when not in use the focusing-frame may be lifted up and secured by a hook 12 thereon, passing through an eye 13 on the top of the camera-body 1.

The board or plate 5 is held in position in the guideway at the rear of the camera by a spring-clip 14. This board or plate 5 is provided below the upper cleat 6 with two rows of sockets 15 and 16, each consisting in the present instance of eight sockets. The upper cleat 6 is provided adjacent one side thereof with four indicating-points 17, and the lower cleat 7 is also provided with four indicating-points 18, the said points on the two cleats being arranged below but in vertical line with each other.

The plate-holder 19 is provided with a slide 19', as usual, for inserting, removing, and exposing the plate contained therein, and is of novel construction. It comprises a back plate 20 and top, bottom, and side pieces 20' $20^2$ $20^3$, adjoining said back plate and suitably connected therewith and with each other by gluing or rabbeting to form a rectangular frame. The top, bottom, and side pieces instead of being separately constructed may be made of one piece. A second rectangular frame $20^4$ has position on the inner side of the holder and is formed on its inner side with a recess $20^5$ and a space in which the slide $19'$ fits. The frame $20^4$ is provided with a facing $20^6$ of heavy cloth or felt to make a light-tight joint between the plate-holder and the camera. A presser-plate 21 is inclosed between the back plate 20 and rectangular frame $20^4$ and fits in grooves $21'$ in the top, bottom, and side pieces $20'$ $20^2$ $20^3$. This presser-plate is provided with a recess $21^2$ for reception of the sensitive plate $21^3$. A plate-spring $21^4$ bears against the presser-plate and clamps the sensitive plate in position. By this construction the sensitive plate may be the full size of the space formed by the top, bottom, and side walls or only the size of the presser-plate. The plate-holder is provided on its inner side, at its upper and lower edges, with dowel pins or pegs 22, adapted to engage with the said sockets 15 and 16 in the transverse cleats of the plate or board 5. When the photographic-plate holder 19 is attached by its dowel-pins in the sockets of the plate or board 5 between the indicating-points nearest the opening 8 in the plate or board, the upper half only of the photographic plate inclosed within the holder is exposed at the said opening 8, and only a quarter of the upper half is exposed. When the photographic holder is shifted so as to bring its dowel-points into the sockets in the plate beneath the second indicating-points, the next quarter-section of the upper portion of the plate is exposed to the opening, and as there are four positions it will be seen that four exposures may be made on the upper half of the plate. By now removing the plate-holder and entering the dowel-points into the lower row of sockets in the same manner a series of four exposures may be made on the lower half of the plate, so that the photographic plate will have received eight exposures, and consequently the developed negative will print eight pictures of the same or different objects, as the case may be.

Of course it will be understood that the series of sockets may be so arranged that any desired number of exposures may be made upon the plate, eight being shown in the present instance for the purpose of illustration only.

The board or plate 5 is provided on its rear side with a recording-frame 23, secured thereto by screws $23'$. A spring-arm 24, constructed of wire, has its lower portion formed into a loop 25, and the terminal end thereof is inserted in the opening in the lower cleat 7. The upper end of this spring-arm is also formed into a loop 26, and this loop end is adapted to be seated in a socket $26'$ in the recording-frame, so as to hold by its spring-tension the photographic holder 5 in position. A card 27, on which a record of the exposures made and the subject of said exposures may be kept, is adapted to be inserted within the recording-frame. By this construction it will be seen that a series of independent exposures may be made upon a photographic plate, so that a series of photographs of one person or object or a series of different pictures may be printed from the developed negative, and that this is done by merely attaching our improved device to a camera of ordinary construction and without the necessity of employing a series of lenses.

A recording device 24 of ordinary construction may be provided on the plate 5, so that the number of exposures made upon the photographic plate may be recorded, in order to determine what space on the plate is left unexposed.

Having thus described our invention, what we claim as new, and desire to secure by Letters Patent, is—

The combination with the back plate of a camera, or the like, transverse flanges projecting rearwardly from said back plate, of a plate-holder provided with pins adapted to engage suitably-located holes in said back plate whereby said plate-holder may be shifted vertically or laterally to different positions on said back plate, the parts being so arranged that the flanges aid in the shifting of the plate-holder by guiding it laterally and limiting its movement beyond the proper point vertically, substantially as described.

In testimony whereof we have signed this specification in the presence of two subscribing witnesses.

CHARLES A. DAKE.
FRANK P. SHEPARD.
FRANK S. PECK.

Witnesses:
G. B. HANEY,
J. S. POPPINO.